W. F. BOOTH.
APPARATUS FOR REMOVING OBSTRUCTIVE DEPOSITS IN OIL WELLS.
APPLICATION FILED JUNE 19, 1920.
1,414,171.  Patented Apr. 25, 1922.
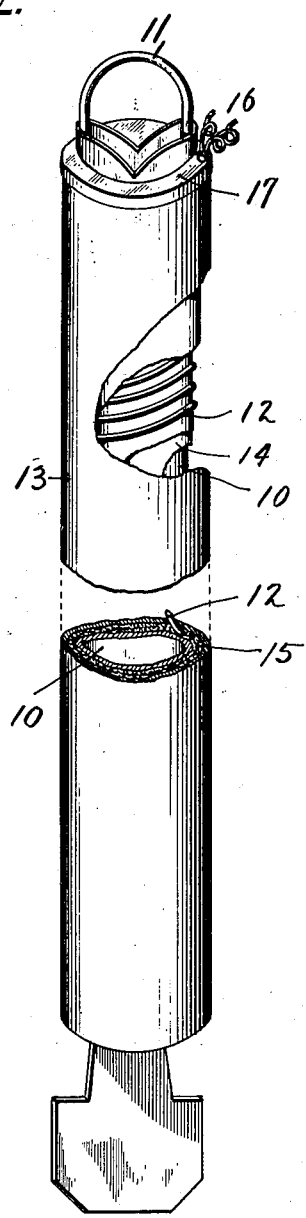
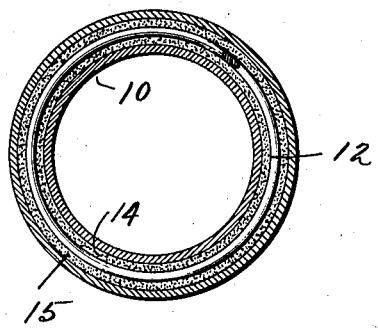

UNITED STATES PATENT OFFICE.

WALTER F. BOOTH, OF LITTLE ROCK, ARKANSAS.

APPARATUS FOR REMOVING OBSTRUCTIVE DEPOSITS IN OIL WELLS.

1,414,171. Specification of Letters Patent. Patented Apr. 25, 1922.

Application filed June 19, 1920. Serial No. 390,201.

*To all whom it may concern:*

Be it known that I, WALTER F. BOOTH, citizen of the United States, residing at 624 Louisiana St., Little Rock, in the county of Pulaski and State of Arkansas, have invented certain new and useful Apparatus for Removing Obstructive Deposits in Oil Wells, of which the following is a specification, reference being had therein to the accompanying drawing.

Due to the formation and the accumulation of a deposit of paraffine and heavy oils in and about walls of oil wells, the flow of oil to the pumping apparatus is obstructed and to an extent in many cases to stop production by the wells. The object of my invention is to deal with this condition and to do so by the employment of means at once easily applied, efficient, and inexpensive. Briefly stated, my invention embodies means for melting or liquefying the obstructing deposits or accumulations so that they will flow into the bailer or pump and thereby be removed from the well in the ordinary course of operation of the pump apparatus. My invention consists in the means employed as hereinafter defined by or embraced within the language or scope of the appended claims.

In the annexed drawings;

Fig. 1 is a perspective view, with parts broken away, of a standard bailer that illustrates one embodyment of my invention which may be used in the practice of my invention;

Fig. 2 is a horizontal section through the same.

In the drawings I show a standard bailer of usual construction, in that it consists of a long hollow cylinder 10 with an eye or loop 11 at the top. Upon the exterior of the cylinder 10 I apply, throughout the length thereof or for any desired portion of its length, any suitable electric heater but which for convenience as shown in the drawings consists of a coil 12 of suitable wire wound helically about the bailer, such wire being suitably insulated from the cylinder 10 and also insulated from their external cylindrical or tubular casing 13. The insulation 14 between the bailer cylinder 10 and the wire may be a tube wrapped, or otherwise applied to said cylinder, and the insulation 15 between the wire and the external casing may be a tube suitably applied. The two terminals 16 of the wire emerge at the top through a ring or collar 17, preferably of insulating material, which seals or covers the upper ends of the casing and insulating bodies and said terminals, of course, are connected with a suitable source of supply of electric energy.

It will be seen that with the tool equipped with suitable heater any deposits or accumulations, as above mentioned, upon the well walls may readily be melted or liquefied and thus placed in a condition in which they cease to obstruct the flow of oil and which permits their removal from the well in the ordinary pumping operation.

What I claim is:

1. An oil-lifting apparatus carrying heating means said apparatus with the heating means being vertically movable.

2. An oil-lifting apparatus comprising a hollow cylinder and having electric heating means on its exterior said apparatus with the heating means being vertically movable.

3. An oil-lifting apparatus comprising a hollow cylinder and having an electric heating member on the outside thereof, an external casing and means insulating said member from said cylinder and from said casing a closure for the casing top and terminals for the heating member emerging through such top.

In testimony whereof I hereunto affix my signature.

WALTER F. BOOTH.